United States Patent
Wisniewski et al.

(10) Patent No.: US 9,358,767 B2
(45) Date of Patent: Jun. 7, 2016

(54) AIRBAG COVER MATERIALS FOR LASER SCORING

(75) Inventors: Aaron Wisniewski, Plymouth, MI (US);
Mathew Barr, Clarkston, MI (US);
Daniel R. Vander Sluis, Rochester Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 26 days.

(21) Appl. No.: 13/158,993

(22) Filed: Jun. 13, 2011

(65) Prior Publication Data

US 2012/0315446 A1 Dec. 13, 2012

(51) Int. Cl.
| | |
|---|---|
| *C08K 3/00* | (2006.01) |
| *C08K 7/00* | (2006.01) |
| *B60R 21/2165* | (2011.01) |
| *B32B 38/00* | (2006.01) |
| *B32B 27/20* | (2006.01) |

(52) U.S. Cl.
CPC ......... *B32B 38/0004* (2013.01); *B60R 21/2165* (2013.01); *B32B 27/20* (2013.01); *B32B 2262/101* (2013.01); *B32B 2305/028* (2013.01); *B32B 2309/10* (2013.01); *B32B 2309/105* (2013.01); *B32B 2310/0843* (2013.01); *B32B 2605/003* (2013.01); *Y10T 156/1082* (2015.01); *Y10T 428/24802* (2015.01)

(58) Field of Classification Search
CPC .............. B32B 2310/0843; B60R 21/2165; C08K 7/00; C08K 2201/005; C08K 3/0033
USPC ........ 428/308.4, 323, 324; 524/493, 445, 451
See application file for complete search history.

(56) References Cited

U.S. PATENT DOCUMENTS

| | | | | |
|---|---|---|---|---|
| 5,091,461 | A | * | 2/1992 | Skochdopole ................ 524/493 |
| 5,667,580 | A | * | 9/1997 | Babler ................ C08K 3/0033 |
| | | | | 106/410 |
| 5,965,655 | A | * | 10/1999 | Mordecai et al. ............. 524/456 |
| 5,979,931 | A | | 11/1999 | Totani et al. |
| 6,420,046 | B1 | * | 7/2002 | Shah et al. .................. 428/475.5 |
| 6,521,675 | B1 | * | 2/2003 | Wu et al. ........................ 521/143 |
| 6,524,694 | B1 | * | 2/2003 | Phillips ......................... 428/323 |
| 6,644,684 | B2 | | 11/2003 | Tsuji et al. |
| 6,716,519 | B2 | * | 4/2004 | Ueno et al. .................. 428/308.4 |
| 6,800,693 | B2 | | 10/2004 | Nishihara et al. |
| 7,592,410 | B2 | | 9/2009 | Van Marion et al. |
| 2004/0213928 | A1 | * | 10/2004 | Sebastian et al. ........... 428/32.17 |
| 2005/0215717 | A1 | * | 9/2005 | Dozeman ....................... 525/192 |

(Continued)

OTHER PUBLICATIONS

Vanderbilt Minerals Fillers for Rubbers and Plastics, Vanderbilt Minerals, LLC., pp. 4-5.*

(Continued)

*Primary Examiner* — Liam J Heincer
(74) *Attorney, Agent, or Firm* — Reising Ethington P.C.

(57) ABSTRACT

A panel for use over a vehicle airbag includes a skin layer with a tear seam formed therein. The skin layer is made from a material that includes a polymer matrix and one or more transmissivity-reducers in the form of microflake fillers or fillers having a monomodal particle size distribution. The transmissivity-reducers are included in an amount that reduces the transmissivity of light through the material to reduce variation in laser scoring processes and also in an amount that does not substantially alter the mechanical properties of the polymer matrix. Skin layers made from these materials can be used in laser scoring processes of TPO coverings that are thinner than previously known.

21 Claims, 3 Drawing Sheets

(56) References Cited

U.S. PATENT DOCUMENTS

| | | |
|---|---|---|
| 2006/0173116 A1 | 8/2006 | Kreuzer |
| 2006/0228542 A1* | 10/2006 | Czubarow .................... 428/323 |
| 2008/0252049 A1 | 10/2008 | Iida et al. |
| 2009/0291281 A1 | 11/2009 | Hanket |
| 2010/0109298 A1 | 5/2010 | Megliola et al. |

OTHER PUBLICATIONS

U.S. Appl. No. 13/039,764, filed Mar. 3, 2011.
International Search Report for application No. PCT/US2012/042191, dated Jan. 31, 2013, 3 pages.

* cited by examiner

AIRBAG COVER MATERIALS FOR LASER SCORING

TECHNICAL FIELD

The present disclosure relates generally to materials for use in airbag coverings having tear seams.

BACKGROUND

Various types of fillers may be used in polymeric materials to affect their material properties. For example, certain non-organic fillers, such as glass fibers or other mineral-based fillers, may be used to increase the rigidity or modulus of a polymer matrix to make it more useful as a structural material or to increase its resistance to deformation when exposed to high temperatures or loads. Other types of fillers, such as elastomeric materials, are sometimes used to increase the toughness or impact strength of a polymer matrix. Such fillers are typically included in amounts that are sufficient to impart one or more properties of the filler material at least partially to the resulting composite material. For example, glass fibers may be added to a polymer matrix to make a composite material with a tensile modulus somewhere between the tensile modulus of the polymer matrix and the glass fibers. It is not unusual for such polymer composites to include fillers in amounts of 25% or more.

In certain applications, attempts are made to balance filler types and amounts to provide an optimum combination of mechanical properties. For example, a polymer-based material for use in hinge-type airbag covers is described in U.S. Pat. No. 6,644,684 to Tsuji et al. The Tsuji patent discloses certain thermoplastic elastomer (TPE) material formulations in an attempt to balance high material rigidity with high toughness; the high rigidity being desired for resistance to heat deformation and deformation due to passenger contact with the cover, and the high toughness being desired so that the cover does not break into loose pieces that get projected into the vehicle interior upon airbag deployment. However, some materials that toughen polymers also reduce their rigidity. Tsuji purports to solve this problem by providing an olefin-based plastic material that is modified with elastomeric materials having particular chemical compositions in specific amounts, teaching that such materials may have sufficient stiffness to avoid deformation in use while having sufficient toughness to avoid breakage of the material when the hinge-type airbag cover opens during airbag deployment.

SUMMARY

According to one embodiment, a panel for use over a vehicle airbag includes a substrate having an outer surface and a covering comprising a decorative skin layer disposed over the outer surface of the substrate. The skin layer includes an inner surface with a tear seam formed therein that faces toward the outer surface of the substrate. The skin layer is formed from a material that comprises a resin matrix and a filler material. The filler material is in the form of microflakes distributed through substantially the entire thickness of the skin layer.

According to another embodiment, a material composition for use in a laser scoring process includes a resin matrix and one or more transmissivity-reducing components other than carbon black dispersed within the resin matrix. The resin matrix includes a plurality of olefinic resin components that together are the major constituent of the material. The total amount of transmissivity-reducing components does not substantially alter at least one of the stiffness or the hardness of the resin matrix.

According to another embodiment, a material composition for use in a laser scoring process includes a polymer matrix, talc, and two or more transmissivity-reducing components, wherein the total amount of non-polymeric constituents is less than about 10 wt %.

According to yet another embodiment, a method of making a panel for use over a vehicle airbag includes the steps of: (a) providing a covering that includes a decorative skin layer formed from a material that includes a transmissivity-reducing component other than carbon black; (b) attaching the covering to a substrate; and (c) laser cutting an angled tear seam in the panel. The tear seam extends from an inner surface of the substrate and into the skin layer.

DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

When a non-visible tear seam is formed in the inner surface of an airbag covering, a read-through phenomenon can occur where a witness mark or line is apparent on the visible opposite surface of the covering. For example, the same material pre-weakening that makes it possible for an airbag to breach the covering at a predictable location may also cause localized variation in certain material behaviors, such as expansion and contraction, sagging, or reactions to applied stresses, particularly over long periods of time and/or with exposure to high temperatures. Of course, where a non-visible tear seam is desired, such a read-through phenomenon is undesirable.

Certain desirable characteristics of covering materials can aggravate the problem. For example, some materials that have a luxurious feel acquire that feel from a combination of material type (e.g., soft or highly flexible material types) and relatively low thickness. High material flexibility may cause read-through to be more prevalent, and thinner materials may not have sufficient material thickness to form a proper functioning tear seam without read-through. It may also be more difficult to form tear seams in thinner materials, because as material thickness decreases, typical process-related variation in dimensions such as the depth of a stress concentrator becomes a larger portion of the overall thickness, thus shrinking the processing window. Further, some material types are inherently more sensitive to tear seam forming processes, which can also shrink processing windows.

The following description is directed at various embodiments of materials and techniques that can improve the ability to consistently laser score covering materials for use over airbags. These materials and techniques may be used to form coverings that include airbag tear seams having certain combinations of material types and thicknesses that until now have not been available for use in vehicle interiors. Certain material filler types and/or filler particle geometries may be used to affect the transmissivity of light through the material, which, as described herein, may be used to decrease laser scoring process variability to levels that allow the use of covering materials over airbags that are thinner, lower cost, lightweight, more weather-resistant, and/or more luxurious-feeling than previously known.

Figure 1:
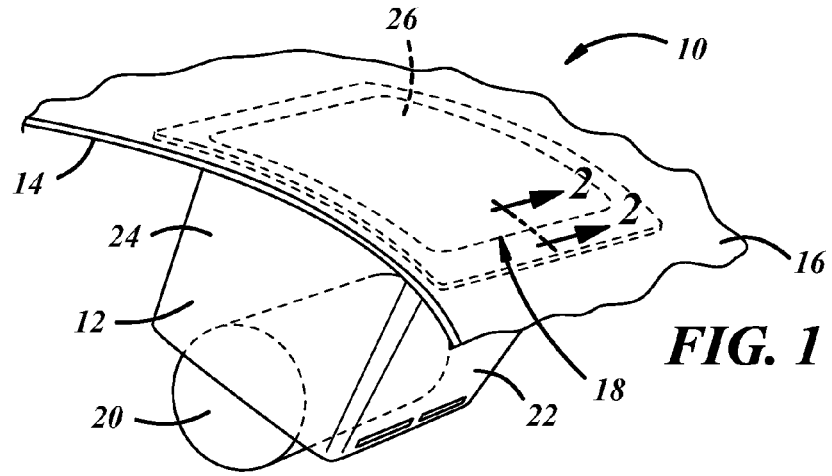
FIG. 1 is a cutaway view of an exemplary instrument panel with a non-visible tear seam arranged over an airbag module.

Referring now to FIG. 1, a cut-away view of an exemplary vehicle instrument panel 10 is shown with an airbag module 12 installed therebeneath. It is noted that neither FIG. 1 nor any of the other figures provided are necessarily to scale. Instrument panel 10 includes one or more layers of materials, and each layer may include its own separately weakened portion or tear seam for the formation of airbag deployment openings. The portion of instrument panel 10 shown in the figure is the passenger side of the instrument panel 10 and includes substrate 14, covering 16, and tear seam 18. Tear seam 18 is a non-visible tear seam in this example. The particular tear seam 18 shown is generally rectangular and located to correspond with underlying airbag module components. The tear seam may assume other known shapes, such as a U-shape, H-shape, or X-shape, to name a few examples. A vehicle passenger side airbag is used only as an example of one type of airbag that may benefit from the following disclosure, but any type of panel for use over a vehicle airbag can be used in accordance with these teachings.

Airbag module 12 is any component or device that includes an airbag arranged to deploy into the cabin of a vehicle when inflated. In this embodiment, airbag module 12 is a passenger airbag module and includes an airbag canister 20 and a housing 22. An airbag deploys from canister 20 toward panel 10 and the vehicle interior when necessary. The housing 22 supports the airbag canister 20 beneath instrument panel 10 and may include a chute 24 that helps to guide the airbag during deployment. This is only one version of an airbag module, while other modules may not include a canister or a separate housing and may include other types of components to compliment the functionality of the airbag. In the particular embodiments shown in FIGS. 1-3, airbag door 26 is formed from the portion of substrate 14 lying inboard of the tear seam 18 during airbag deployment when the tear seam functions to form the deployment opening.

Figure 2:
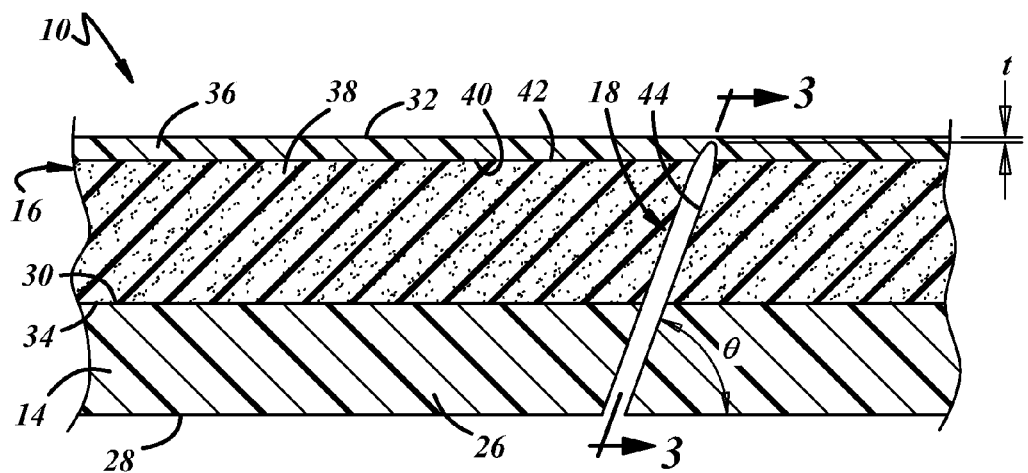
FIG. 2 is an enlarged cross-sectional view of a portion of the instrument panel of FIG. 1 showing a tear seam including an angled cut.

FIG. 2 is a partial cross-sectional view of the instrument panel of FIG. 1 taken through tear seam 18. Substrate 14 is the main component of instrument panel 10 to which other components may be attached and/or extend from for functional or aesthetic purposes and includes inner and outer surfaces 28 and 30. The thickness of the substrate generally ranges from 2.0 mm to 4.0 mm for polymer-based materials. Covering 16 overlies substrate 14 and may be provided for decorative purposes. The covering includes visible outer surface 32 and opposite inner surface 34. Covering 16 may be attached to the outer surface 30 of the substrate 14 with a suitable adhesive or by other means, such as having its edges wrapped around edges of substrate 14 and attached to inner surface 28.

In the particular embodiment of FIG. 2, covering 16 is a bi-layer material that includes a skin layer 36 and an inner layer 38. Skin layer 36 is generally decorative and substantially non-structural and may be constructed from a pliable material. The skin layer provides the visible outer surface 32 of the covering 16, and also includes an opposite inner surface 40. Inner layer 38 may be constructed from a compressible foam material and lies between substrate 14 and skin layer 36. Inner layer 38 in this example provides covering inner surface 34 and also includes an opposite outer surface 42. Inner layer 38 may be included to provide a softer tactile feel to the covering 16 and to the overall instrument panel than if the skin layer was in direct contact with the more rigid substrate 14. Inner layer 38 may also help level uneven areas in the underlying substrate, conceal substrate features, and provide more structure to skin layers that may be otherwise too thin and/or flexible to be practically handled in a manufacturing environment.

Layers 36 and 38 may be provided as separate unattached layers for assembly to substrate 14, or they may be co-extruded, laminated, adhesively bonded or otherwise attached to each other to form covering 16 separately from substrate 14. In another embodiment, inner layer 38 may be formed in place by disposing an expandable material such as polyurethane foam between skin layer 36 and substrate 14. Covering 16 may include additional layers not shown, such as interposed adhesive layers, paint film layers, or additional intermediate layers similar to layer 38, for example. In one embodiment, inner layer 38 is omitted so that the skin layer is the covering 16.

Individual layer thicknesses may vary, but the overall thickness of covering 16 may range from about 0.2 mm to about 6 mm, in accordance with the individual layer thicknesses, and preferably ranges from about 1.0 mm to about 4.0 mm. The thickness of skin layer 36 may range from about 0.2 mm to about 1.0 mm, and preferably ranges from about 0.3 mm to about 0.7 mm. The selected skin layer thickness depends on several variables such as material type, manufacturability, and desired aesthetic, to name a few. The thickness of inner layer 38 may range from about 0.5 mm up to about 5.0 mm or higher, depending on the desired feel of the instrument panel, for example. In one embodiment, covering 16 has an overall thickness of about 2.0 mm, where the skin layer 36 is about 1.0 mm thick and the inner layer 38 is about 1.0 mm thick. In another embodiment, the skin layer is about 0.5 mm thick, and the inner layer is about 3.5 mm thick, so that the overall covering thickness is 4.0 mm. Of course, these are non-limiting examples, as there are several suitable combinations of layer thicknesses.

The materials used in the described panel components may include polymeric materials selected in accordance with their respective functions. Substrate 14 may be constructed from filled or unfilled thermoplastic materials such as polyolefin-based materials, like polypropylene or thermoplastic olefins (TPOs), or from other thermoplastics such as ABS, ABS/PC, nylon, etc. Suitable substrate filler materials include, but are not limited to, short or long glass fibers or mineral-based fillers. Polypropylene having filler material including long glass fibers in an amount of 20-30% by weight is one example of a suitable substrate material, but other polymeric or non-polymeric materials or composites may be used. Skin layer 36 may be formed from any of a variety of materials typically used in vehicle interiors, including TPOs, thermoplastic elastomers (TPEs), polyvinylchloride (PVC), thermoplastic polyurethanes (PURs), leather, simulated leather, or other types. Material selection may be based on a number of factors, including the desired type of texture for outer surface 32, the tactile feeling of the material, cost, processability, or others. Olefin-based materials such as TPOs or other polymers based on ethylene, propylene, butylene, or butadiene or blends, alloys, or copolymers thereof may be preferred due to their low cost, low density, and wide available ranges of properties. The skin layer material may include filler materials or additives, some of which may be transmissivity-reducing components, as discussed below in greater detail. Inner layer 38 may be constructed from a foam material to provide a soft but resilient feel to the instrument panel. Illustrative polymeric foam materials for inner layer 38 include polyolefin-based foam, polyurethane foam, acrylic-based foam, or polyester foam, to name a few. Some of these materials may be cross-linked for additional resilience and may include open- or closed-cell structures. Other non-foam materials such as felt or textile fibers may be used as well.

Figure 3:
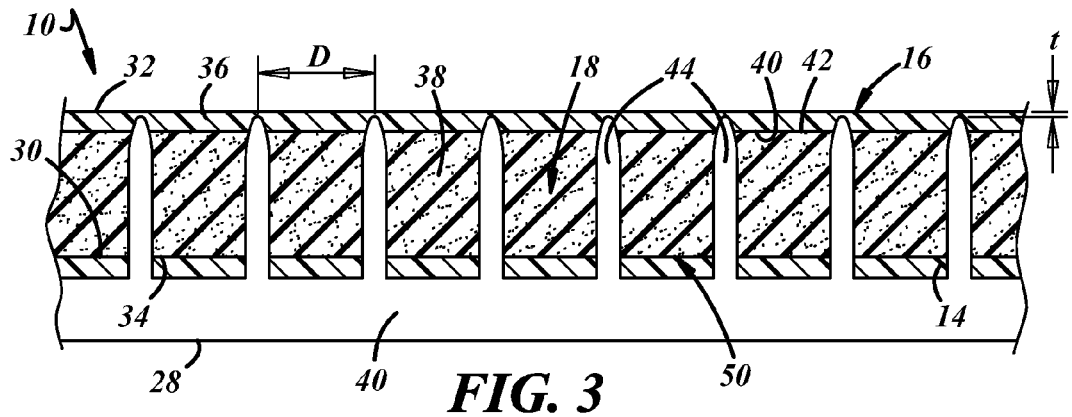
FIG. 3 is a cross-sectional view along the tear seam of FIG. 2 showing a plurality of exemplary laser cuts arranged at consecutive cut locations along the tear seam and extending into an exemplary skin layer.

Tear seam 18 may be described with reference to FIGS. 2 and 3. As used herein, the term "tear seam" refers to any structure intended to weaken any portion of a vehicle component for the purpose of allowing an airbag to break, breach, split, divide, or otherwise make its way through or around the component during airbag deployment. A tear seam may refer to only a portion of a fully patterned tear seam, such as one leg of a U-shaped tear seam or any other curvilinear pattern of weakened portions. Exemplary tear seam 18 is formed in the instrument panel 10 and extends from the inner surface 28 of the substrate 14 and at least partially through the covering 16. In this embodiment, tear seam 18 extends through the thickness of the substrate 14, through the thickness of the inner layer 38, and partially through the skin layer 36. Tear seam 18 includes a plurality of stress concentrators (best seen in FIG. 3) in the form of laser cuts 44 arranged along a pre-determined deployment opening location. Cuts 44 may be formed at an angle θ that ranges from about 45 degrees to 90 degrees in relation to the substrate surface 28. As shown, angle θ is less than 90, which may offer certain benefits as provided in further detail in co-assigned U.S. patent application Ser. No. 13/039,764 filed Mar. 3, 2011 and hereby incorporated by reference in its entirety.

Each laser cut 44 in the figures is a hole or recess in the shape of an elongated finger that does not extend completely through the covering 16. Each cut is approximately the width of the laser beam that formed it and extending into the covering 16 spaced apart by a distance D. Distance D may range from about 1.0 mm to about 5.0 mm, and with highly flexible skin layers may range from about 1.5 mm to about 3.5 mm. Lower values for D are preferable to improve tear seam function, but as with residual wall thicknesses (discussed below), values that are too low may cause visual defects on the visible surface of the skin layer. The depicted cuts 44 and their arrangement is exemplary, as the angle θ may vary, distance D may vary and/or be irregular, and some cuts 44 may have different depths than others, extending only as far into the panel as substrate layer 14 or inner layer 38 in some cases. Distance D may be sufficiently low along portions of tear seam 18 to form a continuous groove such that individual cuts 44 overlap and/or are indistinguishable from one another. While shown as a single tear seam 18 formed continuously through the various layers of panel 10, each layer may also be described as having its own individual tear seam, and in some embodiments, one or more layers of panel 10 do not include a tear seam.

Each cut 44 extends into skin layer 36 to define a residual wall thickness (RWT) at the distal end of each. RWT is designated as t in the figures and may range from about 0.08 mm to about 0.5 mm, depending on the thickness of skin layer 36 and other factors such as the skin layer material and/or distance D between laser cuts. For instance, a value for RWT that is about one-half of the thickness of the skin layer or less may be suitable for proper tear seam function with some materials. The RWT formed in high elongation skin layers, such as those made from certain TPO formulations, is preferably in a range from about 20% to about 40% of the thickness of the skin layer or less for proper tear seam function. For instance, some TPO formulations have values for elongation at break greater than 200% when tested in accordance with ASTM D412. Some other TPO formulations have values of elongation at break greater than 300%, while others have such values in excess of 800% or up to 1000%. Skin layer materials having relatively high elongation properties may cause the tear seam not to function properly—i.e., not breach or split—if the RWT is too high. In one embodiment, the preferred residual wall thickness t ranges from about 0.1 mm to about 0.2 mm for some skin layers, such as those fabricated from certain TPO formulations. For example, a preferred high elongation skin layer may have a thickness of about 0.5 mm and an average RWT of about 0.15 mm, or an RWT value that is about 30% of the skin layer thickness. In another embodiment, a high elongation skin layer may have a thickness ranging from about 0.3 mm to about 0.4 mm and an average RWT value of about 0.1 mm or about 25-33% of the skin layer thickness. As discussed below, prior to the development of the materials and techniques below, such low values for RWT have not been successfully produced by laser scoring, particularly with high elongation materials such as TPOs.

Figure 4:
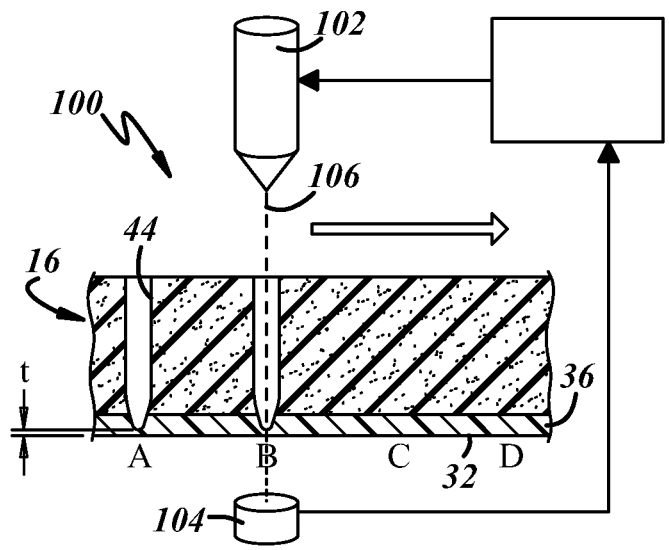
FIG. 4 is a schematic representation of an illustrative laser scoring process.

FIG. 4 illustrates one technique for controlling RWT at each laser cut. A laser cutting system 100 includes a light source 102 and a sensor 104 arranged on opposite sides of a covering 16 that includes skin layer 36. The underlying substrate 14 has been omitted in the figure for simplicity, but is included as arranged in the previous figures in a preferred embodiment. Skin layer 36 may be laser scored alone, with an underlying substrate, with one or more additional layers such as inner layer 38 as shown, or with a substrate and one or more additional inner layers. Exemplary techniques for cutting through multiple layers of different types of panel materials, including the use of multiple laser power levels, are disclosed in previously mentioned U.S. patent application Ser. No. 13/039,764. Light source 102 is constructed and arranged to direct a beam 106 of laser light toward inner surface 40 of the skin layer. Sensor 104 faces toward outer surface 32 of the skin layer and is located within the projected path of beam 106 and is configured to sense energy from the laser light source 102. For example, sensor 104 may be configured to sense light of a particular wavelength or range of wavelengths that includes the laser light wavelength. The laser light source 102 and sensor 104 are configured to move together as source 102 moves along a path (left to right in the figure) that directs beam 106 to various consecutive locations such as A-B-C-D along the pre-determined deployment opening location to form the tear seam.

To form a laser cut 44 in the covering to the desired value for t, source 102 is energized and directs beam 106 toward the skin layer inner surface as shown. When beam 106 first impinges on covering 16, sensor 104 is generally not detecting any light energy from the direction of source 102 because the transmissivity, or the fraction of light (at the particular wavelength of interest) passing completely through the covering, is essentially zero when covering 16 is at its full thickness. At some point during forming an individual cut, the beam 106 extends into covering 16 to a distance sufficient to cause the transmissivity to be greater than zero, typically just before or after it extends partially into skin layer 36. Sensor 104 detects the intensity or amount of light transmitted through the remaining thickness of covering 16 while a cut 44 is being formed. System 100 is automated and configured to stop cutting at a particular cut location when sensor 104 detects a pre-determined amount of light being transmitted through the remaining thickness of skin layer 36 from source 102. The pre-determined amount of light that results in the desired RWT for a particular cover or panel assembly may be determined experimentally and represented in system 100 as a user-set "cut-off voltage"—i.e., a setting that informs system 100 at what sensor output voltage (correlated to the amount of light sensed) it should stop cutting at one cut location and move to the next cut location along the desired tear seam path.

As is apparent from the operation of system 100, transmissivity of light through a covering material is a function of at least the thickness of the material(s). Transmissivity has also been found to be a function of the color of the covering material, and more particularly the color of the skin layer 36. For instance, darker materials may have a lower transmissivity than lighter materials of the same thickness. This has been experimentally determined by observing sensor cut-off voltage when laser cutting materials of different colors. Skin layer materials with relatively high transmissivity can cause a problem with laser scoring in that when the transmissivity at a given thickness is relatively high—i.e., the material is more transparent to the laser light—the sensor cut-off voltage may be reached with no gradual increase in sensor voltage leading to the cut-off voltage. In other words, the first amount of light detect by the sensor may be enough to immediately reach the cut-off voltage, and the system stops cutting and indexes to the next cut location. For example, where a pulsed laser is used for cutting, the sensor cut-off voltage may sometimes be reached on the first pulse of the laser into the skin layer. This scenario leads to a cut having a RWT that is almost the full thickness of the covering that will not provide sufficient stress concentration to function as part of a tear seam. Stated differently, the signal-to-noise ratio is too low for the sensor to function properly and provide consistent RWT values at each cut location.

Figure 5:
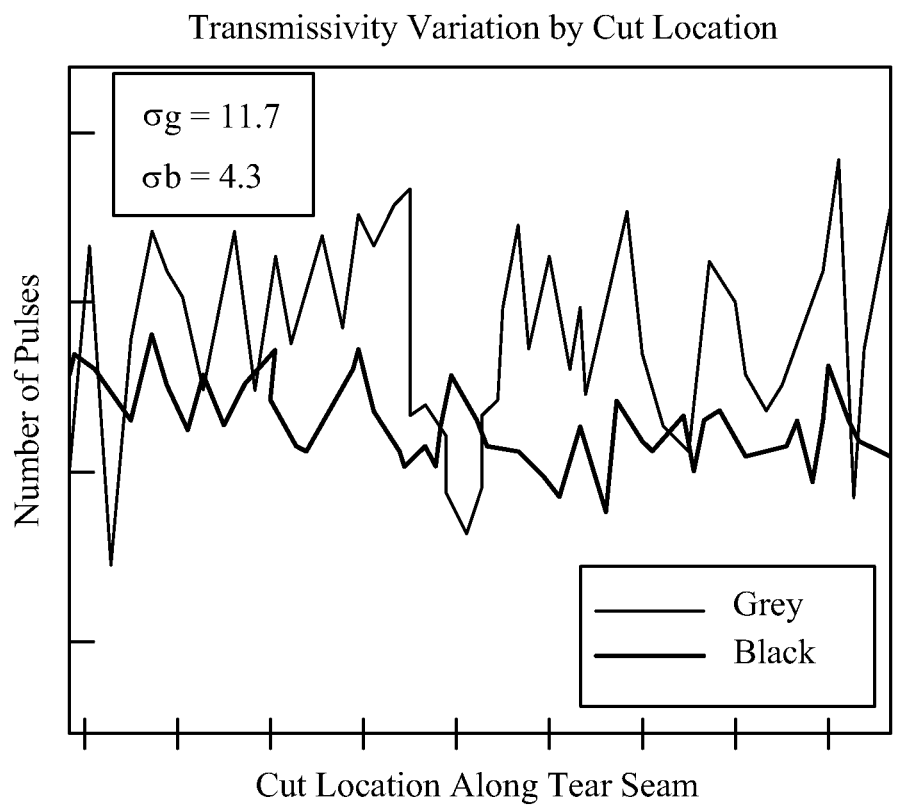
FIG. 5 is a chart showing one possible effect of transmissivity variation in sample skin layer materials.

It has been discovered that transmissivity may also be a function of cut location when laser scoring widely available skin layer materials. In other words, the transmissivity can vary from one laser cut location to another. This phenomenon was uncovered in laser cutting experiments conducted on black skin layer material and on a lighter-colored skin layer material, each having the same base TPO material composition and skin layer thickness of 0.5 mm. For purposes of simplicity in the following explanation, the lighter-colored skin layer material will be referred to as grey. The lines in the chart of FIG. 5 are general representations of the results (the chart does not include the actual data). Cut location is plotted along the x-axis of the chart, and the number of laser pulses required to reach the sensor cut-off voltage is plotted along the y-axis, where each laser pulse has the same power density and duty cycle and the number of cut locations in the sample shown is about 50 consecutive locations. For purposes of the experiments, sensor cut-off voltage was set to a different level for each color of material to cause the average number of pulses (y-axis) to be comparable between materials for an adequate comparison of variation. An infrared ($\lambda$=10,600 nm) $CO_2$ laser was used for cutting.

The most noticeable result in the chart of FIG. 5 is the much larger range in the number of pulses required to reach the sensor cut-off voltage with the grey material when compared to the black material. The standard deviation among black samples averaged about 4.3 pulses centered around a mean value of about 40 pulses, while the standard deviation among grey samples averaged almost three times that at about 11.7 pulses centered around a mean value of about 50 pulses. The standard deviation for the actual sensed cut-off voltage was also calculated and was about 0.2 V for the black material and about 0.4 V for the grey material. As can be seen, transmissivity varied by cut location to a much greater degree with the non-black material. The grey skin layer material included some laser cuts that penetrated the outer surface of the skin and a large portion of laser cuts that did not reach the desired RWT, which was 0.15 mm in this experiment. It is thought that the naturally more absorbent black material tends to at least partially mask the location-variable nature of the transmissivity that is otherwise present in the base skin layer material. Even with black TPO skin layers, however, laser scoring a tear seam into a skin layer having a smaller thickness of 0.4 mm exhibited problems similar to those seen with the 0.5 mm grey material.

New material formulations for covering skin layers have been developed in response to these high levels of variation in the laser cutting process. These formulations have demonstrated a marked improvement in transmissivity variation across the entire area of the skin layer. For example, some embodiments formulated in the same color of grey as those in the above-described experiments exhibit standard deviations in the same type of experiment that are as low as or comparable to the standard deviations described above in conjunction with the black skin layer material. Further, black formulations using the newly developed compositions described below show proportional reductions in process variation as well. These improvements may allow the use of even thinner skin layer materials due to the resulting expansion of the laser cutting process window.

Figure 6:
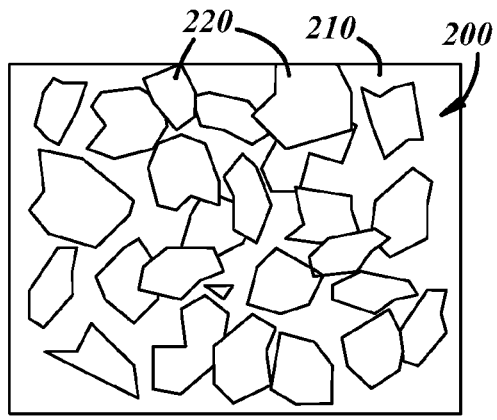
FIG. 6 is a simulated micrograph of a portion of one embodiment of a skin layer material that includes transmissivity-reducing microflakes.

With reference to FIG. 6, an exemplary skin layer material 200 may include a resin or polymer matrix 210 and one or more transmissivity-reducing components 220. In one embodiment, the one or more transmissivity-reducing components are in addition to carbon black. In another embodiment, the skin layer material is substantially free of carbon black, meaning that the material only includes trace amounts of carbon black or amounts low enough not to materially affect the light transmissivity of the material. The simulated micrograph shown in FIG. 6 is on an approximate microscopic scale. The polymer matrix 210 may include any of the aforementioned materials for use in vehicle interiors such as TPO, TPE, PUR, PVC, blends or alloys including these materials, or other types of material or alloy with the desired aesthetic or feel. The matrix 210 is so named because it is the component of material 200 in which transmissivity-reducing components 220 are distributed or dispersed. Matrix 210 includes all of the polymeric components of material 200. While thermoplastic materials may be preferred, it is possible that matrix 210 is or can be at least partially cross-linked and could take on some thermoset properties.

Transmissivity-reducing components 220 are constituents of material 200 that have been determined to provide material 200 with enhanced optical properties as they relate to laser scoring processes. Many of the transmissivity-reducing components described below are inorganic fillers, but skilled artisans armed with the present disclosure will likely be able to adapt these teachings to organic fillers or to other constituents that are not filler materials in a traditional sense. As will be described in further detail, transmissivity-reducing components 220 may function in at least two different modes to reduce the variability of laser scoring processes. Transmissivity-reducing components 220 may function by reducing the bulk transmissivity of material 200 when compared to the matrix 210 alone, or by more uniformly distributing filler materials to reduce the dependence of transmissivity on the location of each laser cut. Reducing the bulk transmissivity of the material can allow the aforementioned process cut-off voltage to be set at a value that allows the sensor to operate in a more usable range and/or to increase the effective resolution of the sensor. A more uniform distribution of filler materials can increase consistency in the laser cutting process by ensuring that similar amounts of the filler materials are encountered by the laser light at each cut location.

In the particular embodiment of FIG. 6, transmissivity-reducing components 220 may be described as two-dimensional fillers or as microflakes. The individual filler elements are flake-like in configuration, being generally flat with opposite major surfaces separated by a comparatively small thickness and may have an aspect ratio of about 50 or more, where the aspect ratio is equal to the largest dimension of an individual flake divided by its smallest dimension. For example, a microflake having a largest dimension of 100 µm and a smallest dimension of 1 µm has an aspect ratio of 100. In one embodiment, the average-sized microflake is about 10 µm or less at its largest dimension (across one of the major surfaces). In another embodiment, the maximum-sized microflake has a largest dimension that is less than about 10 µm. Preferably, the microflakes have a largest dimension that is about 5 µm or less. For purposes as a transmissivity reducer in a skin layer material, where material characteristics such as a soft feel and flexibility may be desirable, the aspect ratio may be as high as is practically possible to maximize the surface area of the microflakes. This can help to minimize the total amount of microflakes necessary to reduce material transmissivity by the desired amount so that the mechanical properties of the matrix 210 are not substantially affected by the addition of the microflakes. Microflake transmissivity reducers may be present in an amount from about 5% or less (0-5 wt %) of the entire material 200 composition, depending on the flake material composition and size, and on the type, amount, and size of other fillers. In one embodiment, microflakes are included in an amount of about 2 wt % and may include talc.

Figure 7:
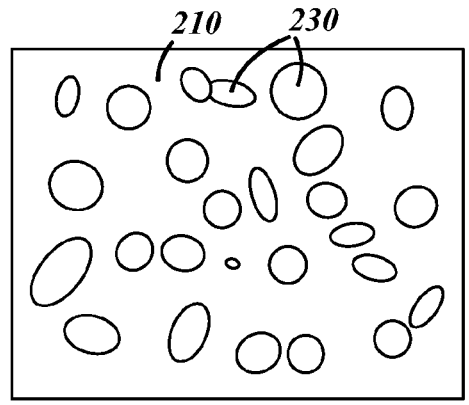
FIG. 7 is a simulated micrograph of the same portion of the skin layer material of FIG. 6, where the microflakes are replaced with particles of the same mass or volume.

FIG. 6 shows a major surface of each microflake. Individual microflakes may have irregularly-shaped edges or perimeters as shown and may be arranged in the material of the skin layer so that the major surfaces of a majority of the microflakes are locally oriented in the same direction as the inner and/or outer surfaces of the skin layer. This orientation is believed to give the transmissivity-reducing components at least some of their functionality. For example, microflakes may be made from a material that at least partially absorbs or reflects the particular wavelength(s) of light of concern. Oriented as described, they can increase the probability that a light beam shining on or into a portion of the material 200 will encounter a transmissivity reducer so that the overall amount of light that is transmitted completely through the material is less than the amount that would otherwise be transmitted through matrix 210. By way of comparison, FIG. 7 depicts non-microflake filler particles 230 dispersed in the same matrix 210. FIG. 7 is an illustrative simulation of filler particles 230 of the same number, mass, and arrangement as the microflakes 220 of FIG. 6, except that particles 230 are generally three-dimensional—e.g., spherical or ellipsoidal in shape. In other words, particles 230 have surface areas that are nearly minimized for the given mass or volume of each particle. When compared with to one another, the representative material cross-sections of FIGS. 6 and 7 show how microflakes may act as transmissivity reducers, filling in a larger percentage of the cross-sectional area of the same portion of material than do the same amount of particles 230 of the same composition. To fill a similar percentage of the cross-sectional area of the depicted portion of material as the microflakes 220 of FIG. 6, a much larger amount of filler material would be required and would likely affect the mechanical properties of the overall material—e.g., increasing the stiffness and/or hardness of the material.

The microflake orientation shown and described in FIG. 6 may be obtained through polymer processing techniques such as extrusion, calendaring, film stretching, injection molding, or other types of processes that cause the matrix 210 to flow while changing shape. Transmissivity reducers 220 can be made from any material suitable to prevent, or at least reduce, transmittance of the desired wavelength of light through it when compared to matrix 210. Suitable materials may include inorganic materials such as talc, mica, graphite, metals, ceramics, glass, or various types of mineral-based materials. It may be possible to form transmissivity reducers 220 from organic materials as well, such as wood pulp or other fibers that can be shaped or otherwise configured to have a transmissivity reducing effect, or such as other polymeric materials. For example, skilled artisans may devise methods of shaping elastomeric impact modifiers to act as transmissivity reducers to certain wavelengths of light.

While many known types of non-microflake filler particles can be included in material 200, they are not transmissivity-reducing components unless they meet certain criteria as a distribution of particles. More specifically, to be a transmissivity-reducing component, a group of filler particles—including all of the filler particles of a particular composition included in the material composition—must have a narrow particle size distribution (PSD) and may optionally have a maximum particle size. For example, one embodiment of a transmissivity-reducing component includes particles having a particle size distribution that is substantially monomodal. As used herein, "monomodal" refers to a PSD that is atypically narrow for the type of particle it references. For example, where a typical PSD for an illustrative type of filler ranges from 25 µm to 50 µm, a PSD ranging from 30 µm to 35 µm would be considered a substantially monomodal distribution. In one embodiment, the transmissivity-reducing component includes filler particles having a PSD such that the maximum particle size is about 5 µm larger than the minimum particle size in the distribution. In another embodiment, the transmissivity-reducing component includes filler particles having a PSD such that the maximum particle size is about 5 µm and the width of the distribution is less than 5 µm. In yet another embodiment, the transmissivity-reducing component includes filler particles having a PSD such that the maximum particle size is less than about 10 µm and the width of the distribution is in a range from about 5 µm to about 9.9 µm. In a preferred embodiment, the transmissivity-reducing component includes colorant particles having a substantially monomodal PSD. Colorant particles may include known colorant types such as various oxides, carbon black, $TiO_2$ or others. In another embodiment, the transmissivity-reducing component includes particles of calcium carbonate, talc, or other inorganic or mineral-based materials.

A narrow PSD may be obtained by known techniques, such as passing filler particles through a first filter having a first mesh size and collecting the particles that pass through the first filter. Those particles may then be subjected to a second filter having a second mesh size smaller than the first, and the particles that do not pass through the second filter may be collected to obtain the substantially monomodal distribution. The PSD of a given batch of filler particles having a known PSD may also be narrowed by passing the filler particles through a filter having a mesh size sufficiently small to exclude at least a portion of the particles from passing through and collecting the particles that do pass through the filter. For example, a batch of filler material having a PSD that includes a minimum particle size of 10 µm and a maximum particle size of 50 µm (PSD width=40 µm), may be passed through a filter with a mesh size of 20 µm to reduced the PSD width to 10 µm, while also reducing maximum particle size and average particle size.

In another embodiment, each transmissivity-reducing component in the material includes particles or microflakes having a maximum particle dimension that is about 5 µm or less. For certain types of materials, selecting particle sizes that are 5 µm or less effectively provides a sufficiently narrow PSD. For example, where an inorganic filler material such as calcium carbonate is available in particle sizes ranging on average from about 0.25 µm to about 10 µm, selecting calcium carbonate particle having sizes of about 5 µm or less may have the effect of selecting an atypically narrow PSD so that this embodiment of a transmissivity-reducing component is both substantially monomodal and has a maximum particle size.

Figure 8:
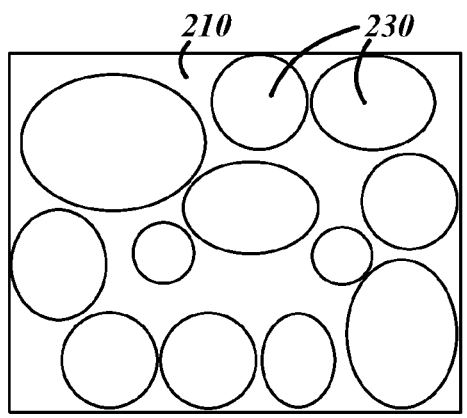
FIG. 8 is a simulated micrograph of a portion of a skin layer material including filler particles having a relatively large average particle size and particle size distribution.
Figure 9:
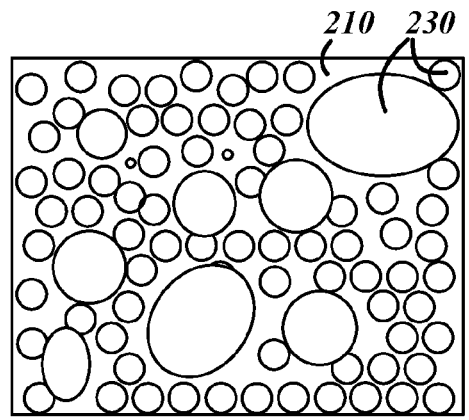
FIG. 9 is a simulated micrograph of a portion of a skin layer material including filler particles having a reduced average particle size compared to that of FIG. 8.
Figure 10:
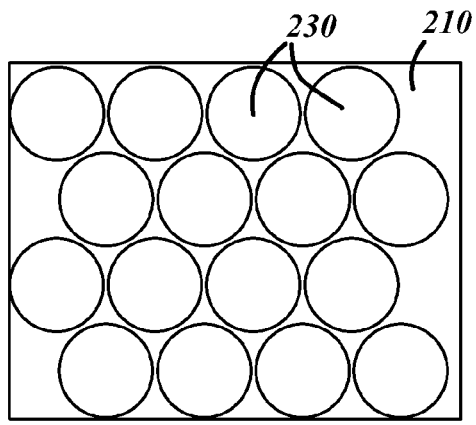
FIG. 10 is a simulated micrograph of a portion of a skin layer material including filler particles having a monomodal particle size distribution.
Figure 11:
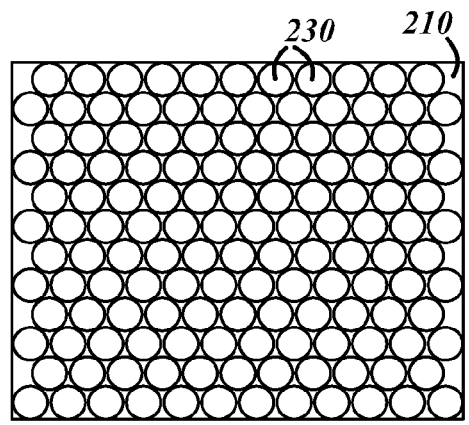
FIG. 11 is a simulated micrograph of a portion of a skin layer material including filler particles having a monomodal particle size distribution and a reduced average particle size compared to that of FIG. 8.

Reference will be made to FIGS. 8-11 to qualitatively describe the theoretical interplay between filler particle size and PSD as they relate to transmissivity. FIG. 8 illustrates an example of filler particles 230 that have both a relatively large average particle size and a relatively large PSD. FIG. 9 illustrates an example of filler particles 230 in which the average particle size is less than that shown in FIG. 8, with a PSD that is also relatively large. FIG. 10 illustrates an example of filler particles 230 in which the average particle size is relatively large, but the PSD is monomodal. As shown, both of the examples in FIGS. 9 and 10 theoretically result in a smaller percentage of the material cross-section being "open"—i.e., not having filler particle material—when compared to FIG. 8. FIG. 11 illustrates an example of relatively small filler particles having a monomodal PSD, thereby exhibiting the transmissivity-reducing effects of both a narrow PSD and small particle size. The examples of FIGS. 8-11 are over-simplified, for demonstration only, to show how filler particles of particular relative sizes and distributions may theoretically provide the skin layer material with more evenly distributed optical properties, thereby enhancing the consistency of laser scoring processes. Monomodal size distributions may also be applied to microflake fillers to enhance their functionality as transmissivity-reducing components. For example, one embodiment of the skin layer material includes talc, in the form of microflakes or filler particles or both, calcium carbonate filler particles, and colorant particles, all of which have a PSD width of about 5 µm or less and a maximum size of about 5 µm or less.

As described, the transmissive properties of the skin layer material can be enhanced over other known skin layer materials without substantially affecting the mechanical properties of the base material. For example, transmissivity-reducing components may be included in skin layer materials by specifically controlling the shape, size, and/or size distribution of filler particles that may be included in the material for other reasons such as to provide the desired color for the skin layer. In one embodiment, transmissivity-reducing components may be included in an amount that does not substantially alter the stiffness (modulus of elasticity, for example) or hardness of the polymer matrix. For example, the total amount of transmissivity-reducing components may be present in the material in an amount of about 10 wt % or less, or in an amount that is between about 0.5 wt % and 10 wt %. In one embodiment, the total amount of non-polymeric components in the material ranges from about 2 wt % to about 8 wt %. In another embodiment, the total amount of transmissivity-reducing components is about 8 wt %, about 2 wt % being talc. Of course, other filler materials may be present that are not configured to be transmissivity-reducing components. Additionally, any number of transmissivity-reducing components may be included, such as a mixture of microflake types or a mixture of microflakes and filler particles having a monomodal PSD.

Commercially available materials may be available that are suitable skin layer materials and that can serve as starting points for the above-described compositions, such as certain products in the Polyone family of products produced by O'Sullivan Films (Winchester, VA). Examples of TPO-based products that may be reformulated to include the disclosed transmissivity-reducing components include the TPO layers of O'Sullivan's TG, OL, or OS products or the PVC/ABS layers of its CA, CP, or LO products. In one embodiment, the TPO layer of the TG, OL, or OS bi-layer product may be reformulated to include talc, to reduce the average particle size of the colorant particles and the calcium carbonate particles, and to narrow the PSD of the colorant and the calcium carbonate to be substantially monomodal. In another embodiment, the same product may be reformulated to include talc and to reduce the average particle size of the calcium carbonate particles, leaving the colorant particles unchanged from their commercially available form.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A material composition for use in a laser scoring process, the material comprising:
    a polymer matrix; and
    two or more transmissivity-reducing components that reduce transmission of infrared laser light through the polymer matrix during the laser scoring process, each transmissivity-reducing component: 1) being in the form of generally flat microflakes, and/or 2) having a substantially monomodal particle size distribution (PSD), wherein talc having a substantially monomodal PSD is one of the transmissivity-reducing components and the elongation at break of the material composition is greater than 200%,
    wherein the material composition is visibly opaque.

2. The material composition of claim 1, wherein the transmissivity-reducing components include calcium carbonate particles and colorant particles.

3. The material composition of claim 1, wherein the talc is in the form of microflakes and present in an amount ranging from about 0.5 wt % to about 5 wt %.

4. The material composition of claim 1, wherein the total amount of non-polymeric constituents is in a range from about 2 wt % to about 8 wt %.

5. The material composition of claim 1, wherein the total amount of talc is about 2 wt %.

6. The material composition of claim 1, wherein one of the transmissivity-reducing components is calcium carbonate particles.

7. The material composition of claim 1, wherein one of the transmissivity-reducing components is colorant particles.

8. The material composition of claim 1, wherein each substantially monomodal PSD is defined as having a maximum particle size of 5 μm and a distribution width of less than 5 μm.

9. The material composition of claim 1, wherein the polymer matrix comprises a thermoplastic olefin.

10. A panel for use over a vehicle airbag comprising a vehicle interior panel substrate, a decorative covering disposed over the substrate, and a tear seam formed in the decorative covering, wherein the decorative covering comprises a skin layer formed from the material composition of claim 1.

11. A method of making a panel for use over a vehicle airbag comprising the steps of disposing a decorative covering over a vehicle interior panel substrate and forming a tear seam in the decorative covering by laser scoring, wherein the decorative covering comprises a skin layer formed from the material composition of claim 1.

12. A visibly opaque material composition comprising a polymer matrix and 2 wt % talc, the talc having a particle size distribution (PSD) with a width that is less than 5 μm, wherein the total amount of non-polymeric constituents is in a range from 2 wt % to 8 wt %,
    the material composition further comprising colorant particles having a PSD with a width that is less than 5 μm.

13. The material composition of claim 12, wherein the talc is in the form of microflakes.

14. The material composition of claim 12, further comprising calcium carbonate particles having a PSD with a width that is less than 5 μm.

15. The material composition of claim 12, wherein the polymer matrix comprises a thermoplastic olefin.

16. The material composition of claim 12 having an elongation at break of greater than 200%.

17. The material composition of claim 12, wherein the total amount of non-polymeric constituents is 8 wt % and the maximum particle size of all non-polymeric constituents is 5 μm or less.

18. A material composition for use in a laser scoring process, the material comprising:
    a polymer matrix; and
    two or more transmissivity-reducing components that reduce transmission of infrared laser light through the polymer matrix during the laser scoring process, each transmissivity-reducing component: 1) being in the form of generally flat microflakes, and/or 2) having a substantially monomodal particle size distribution (PSD), wherein talc is one of the transmissivity-reducing components and the maximum particle size in the material composition is 5 μm or less,
    wherein the material composition is visibly opaque.

19. The material composition of claim 18, wherein all of the transmissivity reducing components have a substantially monomodal particle size distribution.

20. The material composition of claim 18, the talc is present in an amount of 2 wt % talc and the total amount of non-polymeric constituents is in a range from 2 wt % to 8 wt %.

21. The material composition of claim 18, wherein the talc is present in an amount ranging from about 0.5 wt % to about 5 wt %.

* * * * *